United States Patent
Grinnell et al.

(10) Patent No.: US 10,562,332 B2
(45) Date of Patent: Feb. 18, 2020

(54) PRINTABLE MEDIUM INCLUDING GLITTER

(71) Applicants: Anthony Grinnell, Harmony, PA (US); Ya Li, Guangzhou (CN)

(72) Inventors: Anthony Grinnell, Harmony, PA (US); Ya Li, Guangzhou (CN)

(73) Assignees: HARMONY PAPER COMPANY, Harmony, PA (US); GUANGZHOU QKH IMP. & EXP. CO., LTD., Guangzhou (CN)

( * ) Notice: Subject to any disclaimer, the term of this patent is extended or adjusted under 35 U.S.C. 154(b) by 0 days.

(21) Appl. No.: 15/890,337

(22) Filed: Feb. 6, 2018

(65) Prior Publication Data

US 2019/0241003 A1    Aug. 8, 2019

(51) Int. Cl.
| | | |
|---|---|---|
| B41M 5/50 | (2006.01) | |
| B41M 5/52 | (2006.01) | |
| B05D 3/02 | (2006.01) | |
| B05D 5/10 | (2006.01) | |
| C09D 7/43 | (2018.01) | |
| C09D 123/06 | (2006.01) | |
| C09J 5/02 | (2006.01) | |
| C09D 7/61 | (2018.01) | |
| C09D 123/04 | (2006.01) | |
| C08K 3/36 | (2006.01) | |
| C08K 3/08 | (2006.01) | |

(52) U.S. Cl.
CPC .......... *B41M 5/506* (2013.01); *B05D 3/0254* (2013.01); *B05D 5/10* (2013.01); *B41M 5/52* (2013.01); *B41M 5/5254* (2013.01); *C09D 7/43* (2018.01); *C09D 7/61* (2018.01); *C09D 123/04* (2013.01); *C09D 123/06* (2013.01); *C09J 5/02* (2013.01); *B41M 5/5218* (2013.01); *C08K 3/08* (2013.01); *C08K 3/36* (2013.01); *C08K 2003/0812* (2013.01); *C09J 2401/006* (2013.01)

(58) Field of Classification Search
CPC ....................................................... C09D 7/61
USPC .............................................. 428/195.1, 206
See application file for complete search history.

(56) References Cited

U.S. PATENT DOCUMENTS 8,801,142 B2 * 8/2014 Ohashi ...................... B41M 5/00
347/20
2016/0355687 A1 * 12/2016 Hwang ................ C09D 131/04

\* cited by examiner

*Primary Examiner* — Gerard Higgins
(74) *Attorney, Agent, or Firm* — William F. Lang, IV; Lang Patent Law LLC

(57) ABSTRACT

A printable glitter paper includes a first adhesive layer onto which glitter has been deposited, and a second adhesive layer covering the first adhesive layer and glitter. A coating covers the second adhesive layer. Another adhesive layer covers the back side of the printable glitter paper. The printable glitter paper provides excellent retention of the glitter, and a high level of smoothness for high quality printing.

24 Claims, 12 Drawing Sheets

PRINTABLE MEDIUM INCLUDING GLITTER

TECHNICAL FIELD

This application relates to printing paper and other printing mediums. More specifically, a printable paper or other printable medium having glitter firmly adhered therein or thereto. The printable medium has a smooth printing surface that is receptive to various types of printing inks. A method of making the printable medium, and a coating for the printable medium, are also provided.

BACKGROUND INFORMATION

Glitter is often desirable element for printed products such as invitations, greeting cards, holiday cards, gift bags, commercial packaging products such as folding cartons, tags, retail bags, labels, and other similar products. However, prior techniques for applying glitter to the printed products have not resulted in ideal adhesion of the glitter to the substrate. Bending, folding, or abrasion of the paper or other printable medium often causes glitter to fall off. Adherence of the glitter is particularly critical when the paper or other substrate to which the glitter is adhered is to be passed through a printer. In particular, digital, offset, offset UV, lithographic, flexographic, ink jet, and toner based printing machines require the use of a glitter coated printing medium that will not leave any glitter or other undesirable residue inside the printer. Shedding glitter within such a machine can cause extensive damage to the machine, requiring significant repair and/or cleanup in order to restore the functionality the machine.

The addition of glitter to paper or other printable mediums can create additional printing problems. In general, a smooth, ink receptive surface is desirable for the highest quality printing. The addition of glitter coated on the substrate using prior art methods compromises the smoothness, ink receptiveness, and ink adhesion, thereby significantly reducing the quality of printing on that glitter-coated printable medium as well as the permanence of any ink that is printed overtop of the glitter.

Accordingly, there is a need for a printable glitter paper or other printing medium providing for complete adherence of the glitter to or within the printable medium. Even more desirable would be entrapping the glitter within a coating on the paper. There is a further need for printable glitter paper that not only completely and securely traps the glitter, but also provides a sufficiently smooth, ink-receptive surface for high quality or even photo grade print quality on the printable medium.

SUMMARY

The above needs are met by a printable medium. The printable medium comprises a flat, flexible substrate having a front surface and a back surface. The printable medium further includes a first adhesive coating covering a portion of the front surface of the substrate. A plurality of glitter flakes are dispersed across substantially all of the first adhesive coating. A second adhesive coating covers substantially all of the first adhesive coating and glitter flakes.

The above needs are further met by a method of making a printable medium. The method comprises providing a flat, flexible substrate having a front surface and a back surface. A first adhesive coating is applied to a portion of the front surface of the substrate. A plurality of glitter flakes are applied across substantially all of the first adhesive coating. A second adhesive coating is applied to substantially all of the first adhesive coating and glitter flakes. Heat is applied to the substrate, first adhesive coating, and second adhesive coating.

The above needs are further met by a top coating for a printable medium. The top coating comprising water, silica gel, glycerol, polyethylene, a drying agent, A20 Aluminum powder, a fixative, and a thickener.

The above needs are also met by a method of making a top coating for a printable medium. The method comprises mixing water and silica gel at about 5,000 r.p.m. for about 1.5 hours Glycerol is added, and the resulting combination is mixed for about 20 minutes at about 5,000 r.p.m. Polyethylene and a drying agent are added, and the resulting combination is mixed for about 30 minutes at about 5,000 r.p.m. A20 Aluminum powder is added, and the resulting combination is mixed at about 5,000 r.p.m. for about 30 minutes. A fixative is added, and the resulting combination is mixed for about 2 hours at about 5,000 r.p.m. Additional water is added along with a thickener, and the resulting combination is mixed at about 1,500 r.p.m. for about 3.5 hours.

These and other aspects of the invention will become more apparent through the following description and drawings.

BRIEF DESCRIPTION OF THE DRAWINGS

Like reference characters denote like elements throughout the drawings.

DETAILED DESCRIPTION

Figure 1:
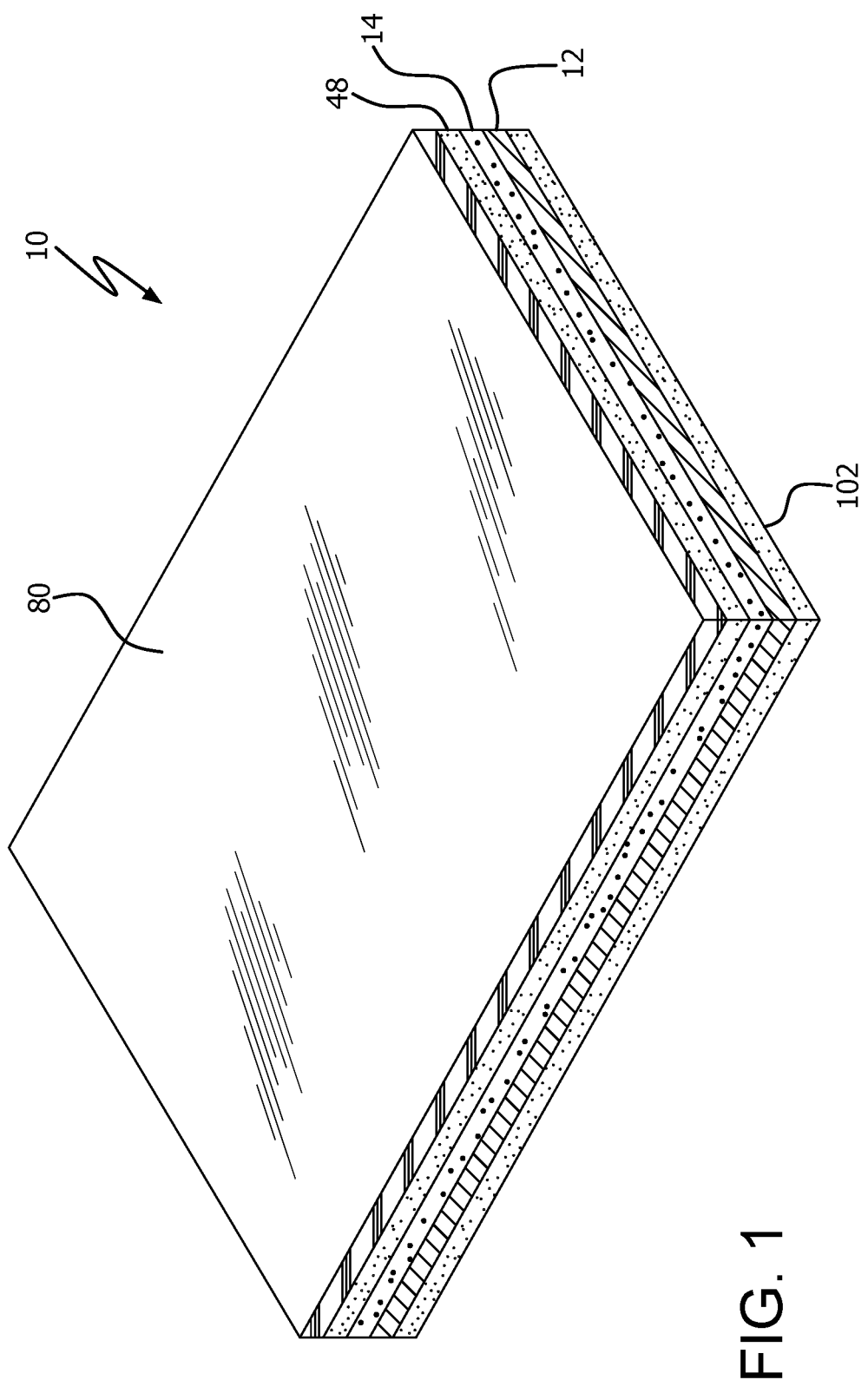
FIG. 1 is a perspective view of a printable glitter paper, illustrating the substrate and various coatings applied thereto.

Referring to the drawings, a printable medium, which in the illustrated example is a printable glitter paper 10 (FIG.

1) and a method of making the printable glitter paper are illustrated. FIGS. 1-6 illustrate the paper itself at various stages in the process of making the paper. FIGS. 7-12 illustrate the process steps of making the paper. As used herein, the term paper includes, but is not limited to, printing and copying papers, various paper boards, paper utilized for certificates, greeting card paper, invitation paper, paper utilized for artwork, solid bleached sulfate (SBS) paperboard, clay coated news back (CCNB) paperboard, coated one side (C1S) paper, coated two sides (C2S) paper, bleached and unbleached kraft and other paper products and cellulose webs suitable for printing. Although the completed product and process of making the completed product described herein utilize the example of paper, the invention is not limited to paper, and the same process steps may be utilized to provide a printable glitter substrate utilizing a substrate other than paper, for example, polyethylene terephthalate (PET). Although the terms front, back, etc. are utilized for convenience of reference in the manner in which they are commonly understood, they are not intended to be limiting except to the extent that certain processes described herein are applied to opposite sides of the substrate. Although uses of the glitter paper are also mentioned herein, such uses are intended to be examples and not limiting.

Figure 2:
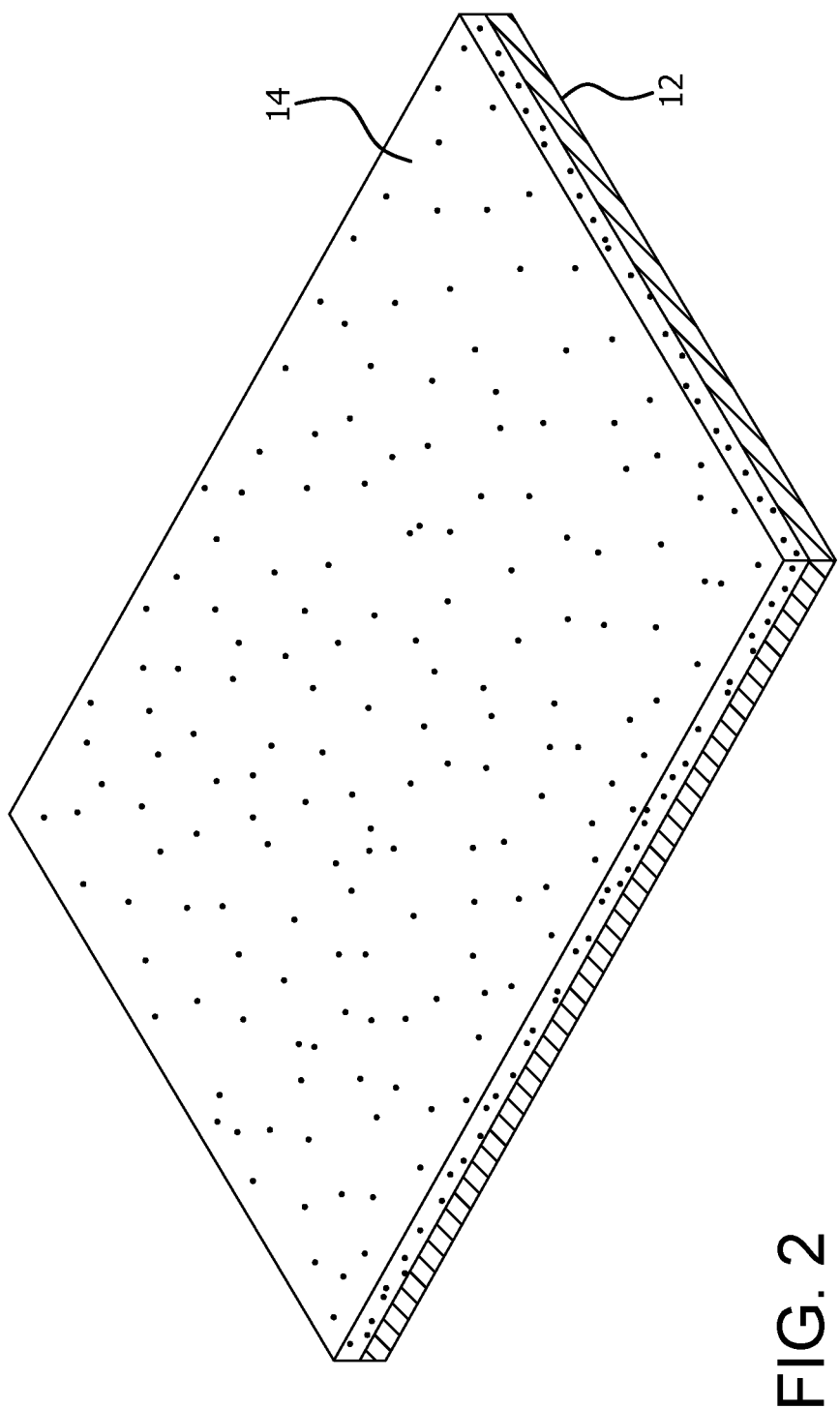
FIG. 2 is a perspective view of a substrate for the printable glitter paper of FIG. 1, after application of a first adhesive layer to the front surface of the substrate.
Figure 7:
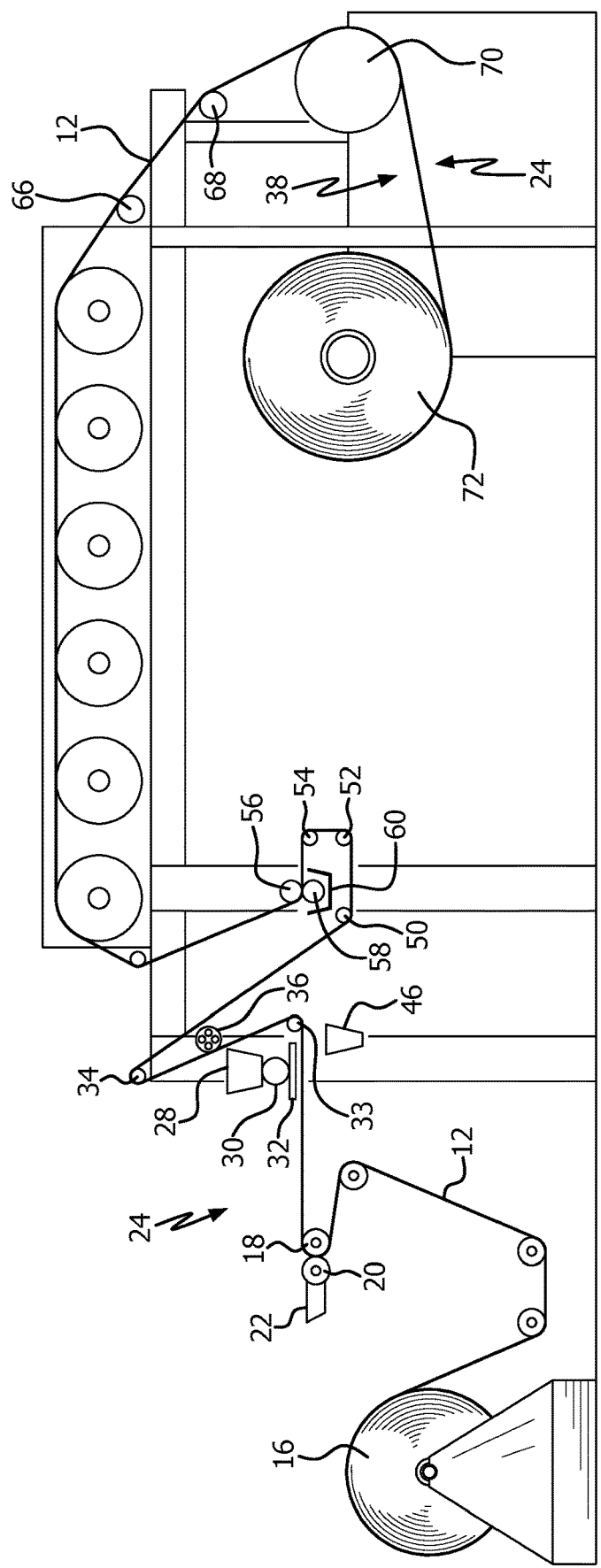
FIG. 7 is a diagrammatic view showing the process of applying a first adhesive layer, applying glitter, removal of excess glitter, applying the second adhesive layer, and drying/curing the adhesive.
Figure 8:
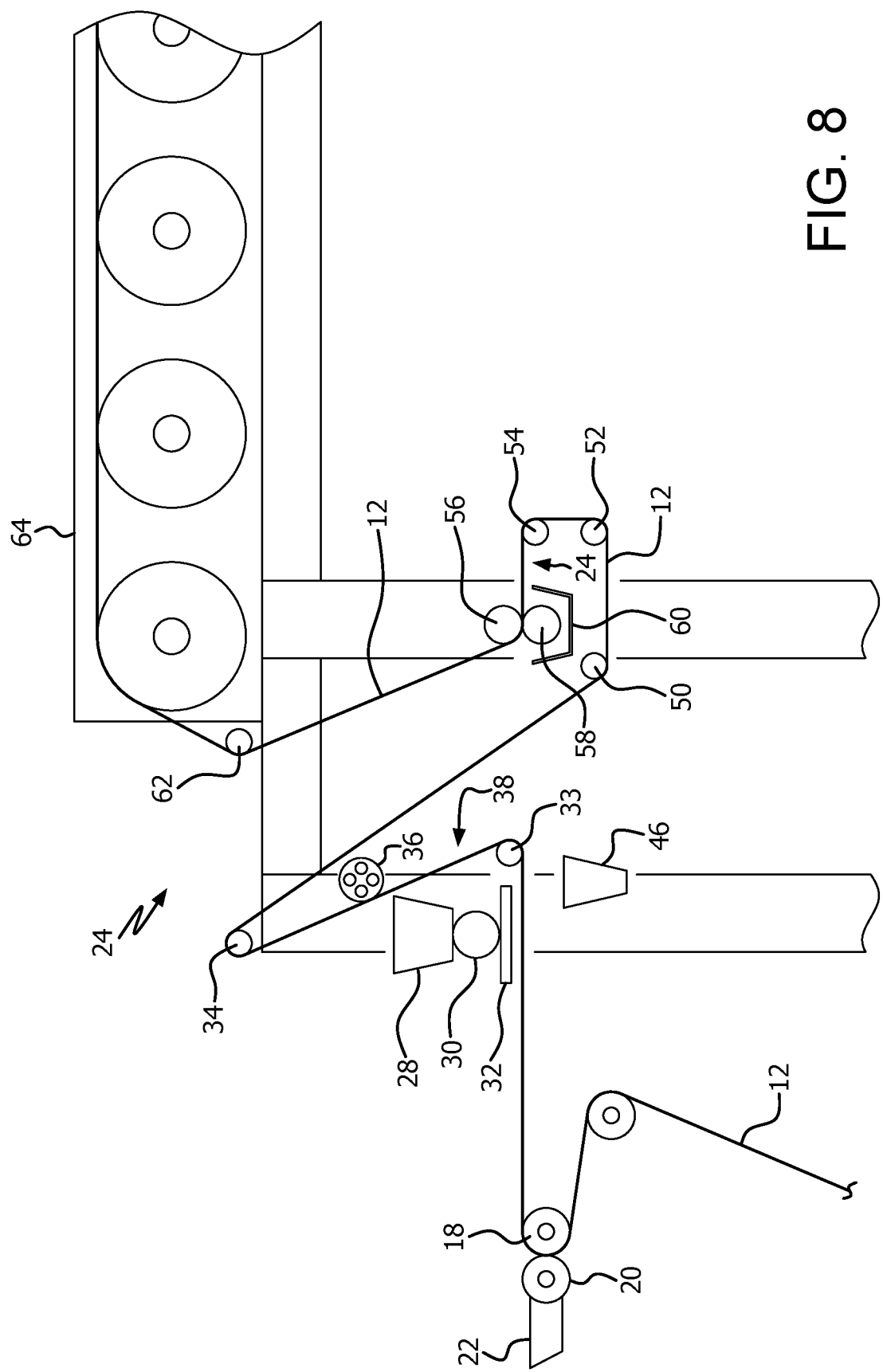
FIG. 8 is a diagrammatic view showing the process of applying a first adhesive layer, applying glitter, removal of excess glitter, and applying the second adhesive layer.

Referring to FIGS. 2, 7, and 8, once the desired substrate 12 has been selected, a first adhesive layer 14 is applied to the front surface of the substrate 12. Although most examples will have a first adhesive layer 14 covering an entire surface of the substrate 12, some examples may include covering only a portion of the surface, for example, leaving an uncovered perimeter region or an uncovered central region. The first adhesive layer 14 in the illustrated example is an oil-based glue, which in the illustrated example includes polyester polyol, isocyanate, and solvents with a ratio of approximately 50% solvents, and 50% oil resin. As shown in FIGS. 7 and 8, the substrate 12 is unrolled from the roll 16 in which it is supplied, and then passed between a roller 18 and roller 20. A glue tray 22 is disposed adjacent to the roller 20, with the interior of the glue tray 22 being in communication with the surface of the roller 20, so that the roller 20 is in contact with the glue within the glue tray 22. As the roller 20 comes in contact with the substrate 12, oil-based glue is applied to the substrate 12 to become the first adhesive layer 14. Since the substrate 12 is in contact with both of the roller 18 and roller 20, the application of excess glue to the substrate 12 is resisted, since the excess glue is squeezed off of the substrate 12 by the rollers 18, 20, and is at least partially carried back towards the glue tray 22 by the roller 20. The first adhesive layer 14 is applied to a thickness of about 0.04 mm to about 0.05 mm in the illustrated example. The substrate 12 then proceeds around roller 18 so that the face to which the adhesive layer 14 has been applied, which is now the front face 24, is oriented upward.

Figure 3:
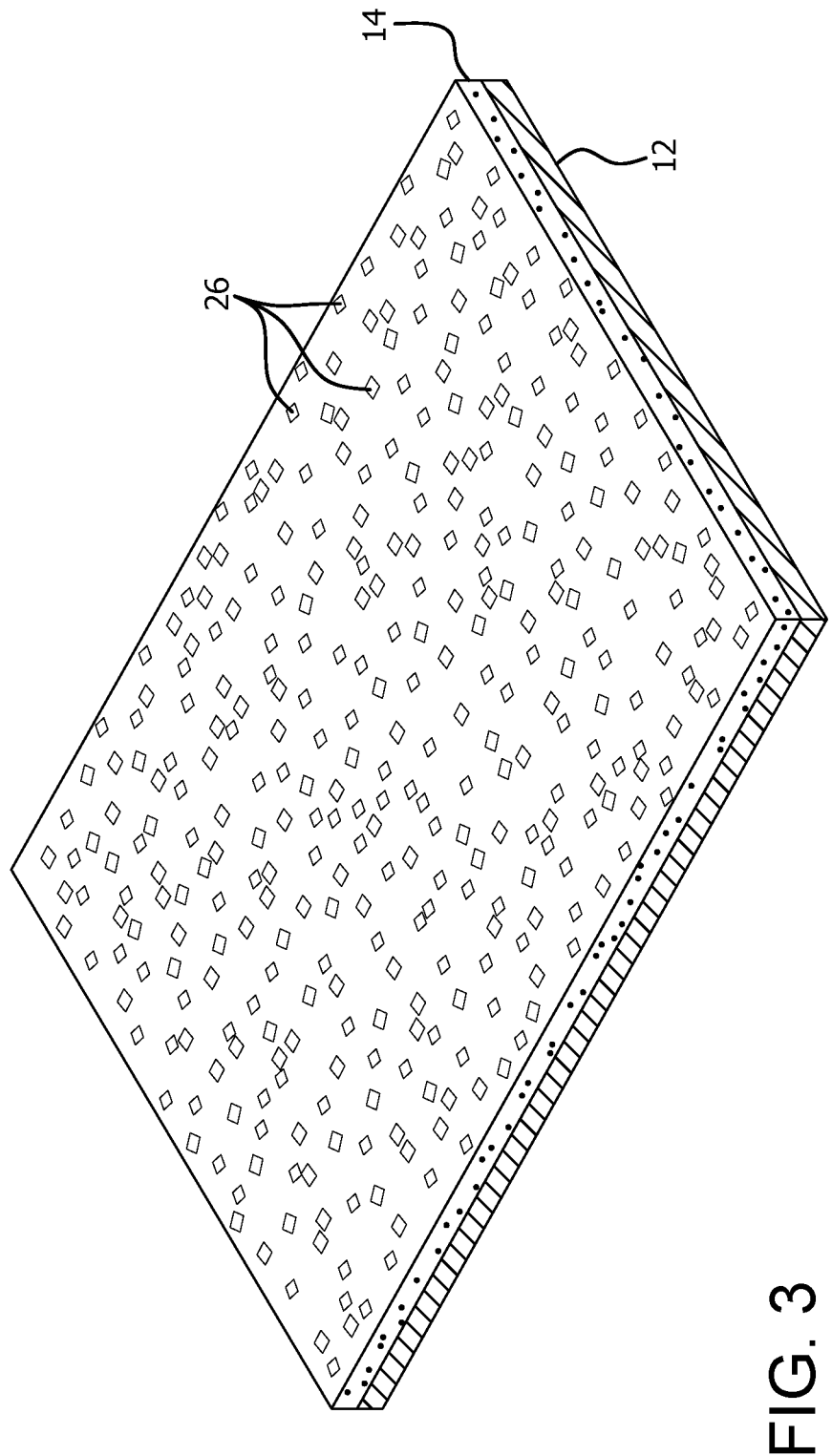
FIG. 3 is a perspective view of a substrate for the printable glitter paper of FIG. 1, after application of glitter to the first adhesive layer.

Referring to FIGS. 3, 7, and 8, the glitter 26 is applied to the adhesive layer 14. The process of making glitter is well known to those skilled in the art, but is described briefly herein. The glitter in the illustrated example is made from a PET roll, which in some examples may be a white PET with a rainbow/holographic film applied thereto. Other colors of PET film, or white PET film to which a color dye has been applied, may also be used, and other types of glitter and/or glitter made from other materials may be used. This film is then pulverized to produce glitter flakes of the appropriate size. In some examples, the size of the glitter flakes is no greater than about $1/120$ inch, and no smaller than about $1/260$ inch. In other examples, the glitter flakes are about $1/256$ inch. These dimensions refer to the setting on the machine that pulverizes the PET film, and the exact size of the glitter flakes may vary within the range that is typically produced by a standard glitter pulverizing machine set for the above referenced dimensions. Expressed differently, a machine set for $1/256$ inch will produce larger and smaller flakes, and this is completely acceptable for the printable medium and process described herein. During the pulverizing process, the glitter pulverizing machine is kept grounded in order to reduce electrostatic charges, and thus reduce clumping of the glitter flakes during application to the first adhesive layer 14.

Figure 9:
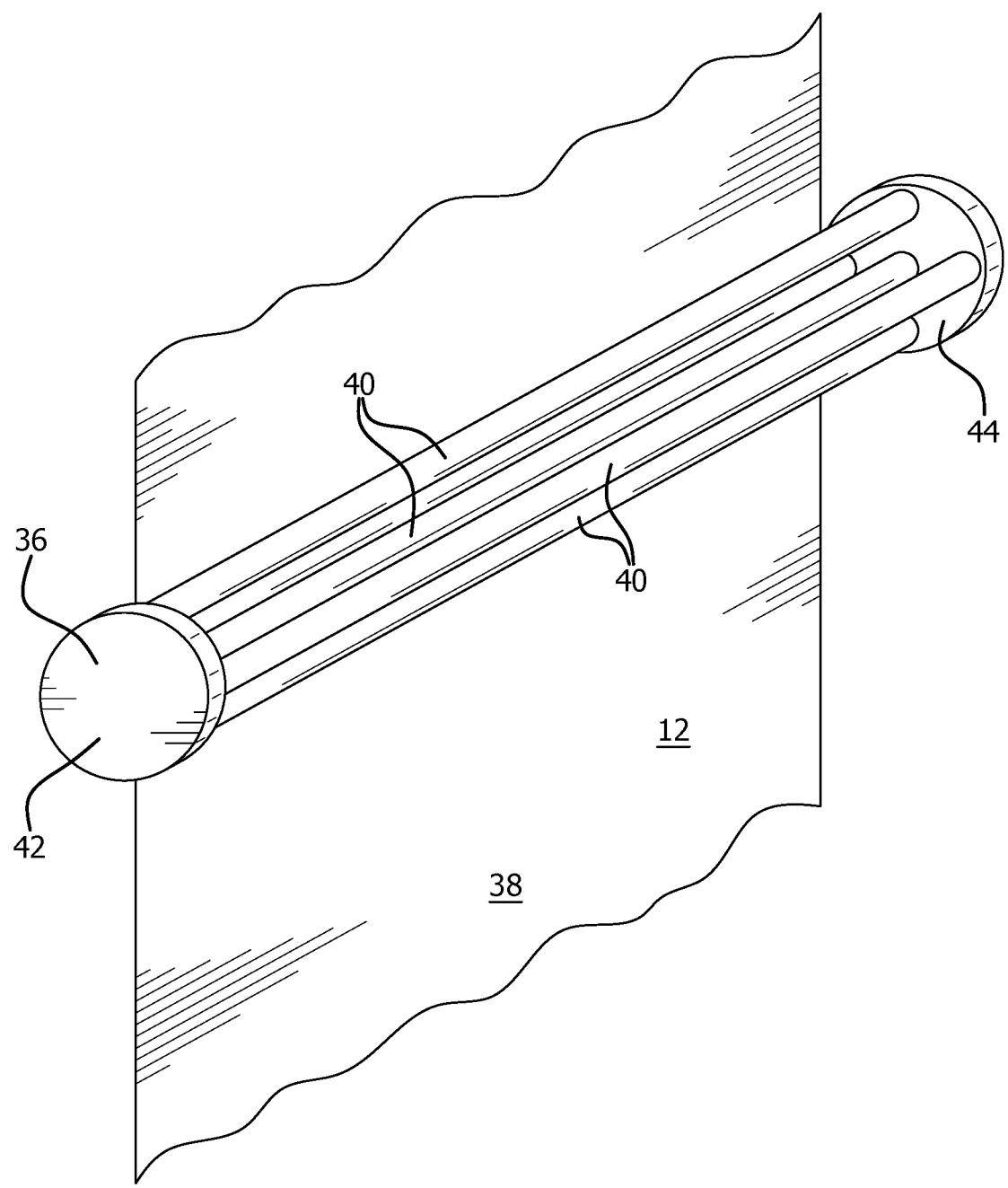
FIG. 9 is a diagrammatic view showing the process of removing excess glitter.

As shown in FIGS. 7 and 8, the substrate 12 proceeds from the above-described adhesive application towards the glitter application stage. A hopper 28 containing the glitter 26 is disposed above a roller 30 for controlling the flow of glitter 26 onto a tray 32. The tray 32 has multiple openings through which glitter flakes 26 fall onto the first adhesive layer 14 that has just been applied to the substrate 12. Once the glitter 26 has been applied, the substrate 12 proceeds in a generally vertical direction, but angled so that it passes over the hopper 28, and then around a roller 34. Referring to FIGS. 7-9, an impact roller 36 is disposed between the rollers 33, 34, so that when the substrate 12 passes between the rollers 30, 34, the back surface 38 of the substrate 12 will come in contact with the sticks 40 extending between the ends 42, 44 of the impact roller 36. In the illustrated example, four sticks 40 are provided on the impact roller 36. The impact roller 36 in the illustrated example rotates at a rate that causes the back surface 38 of the substrate 12 to be impacted by one of the sticks 40 about five times every second, thereby knocking loose glitter 26 from the front surface 24 of the substrate 12. Some of the excess glitter 26 falls back towards the hopper 28. Any excess glitter 26 located near the edges of the substrate 12 falls towards a vacuum collection unit 46, which is disposed below the beater stick roller 36. The substrate 12 preferably comes in contact with the impact roller 36 within a few seconds of application of the glitter, so that excess glitter can be removed before significant drying of the first adhesive layer 14 occurs.

Figure 4:
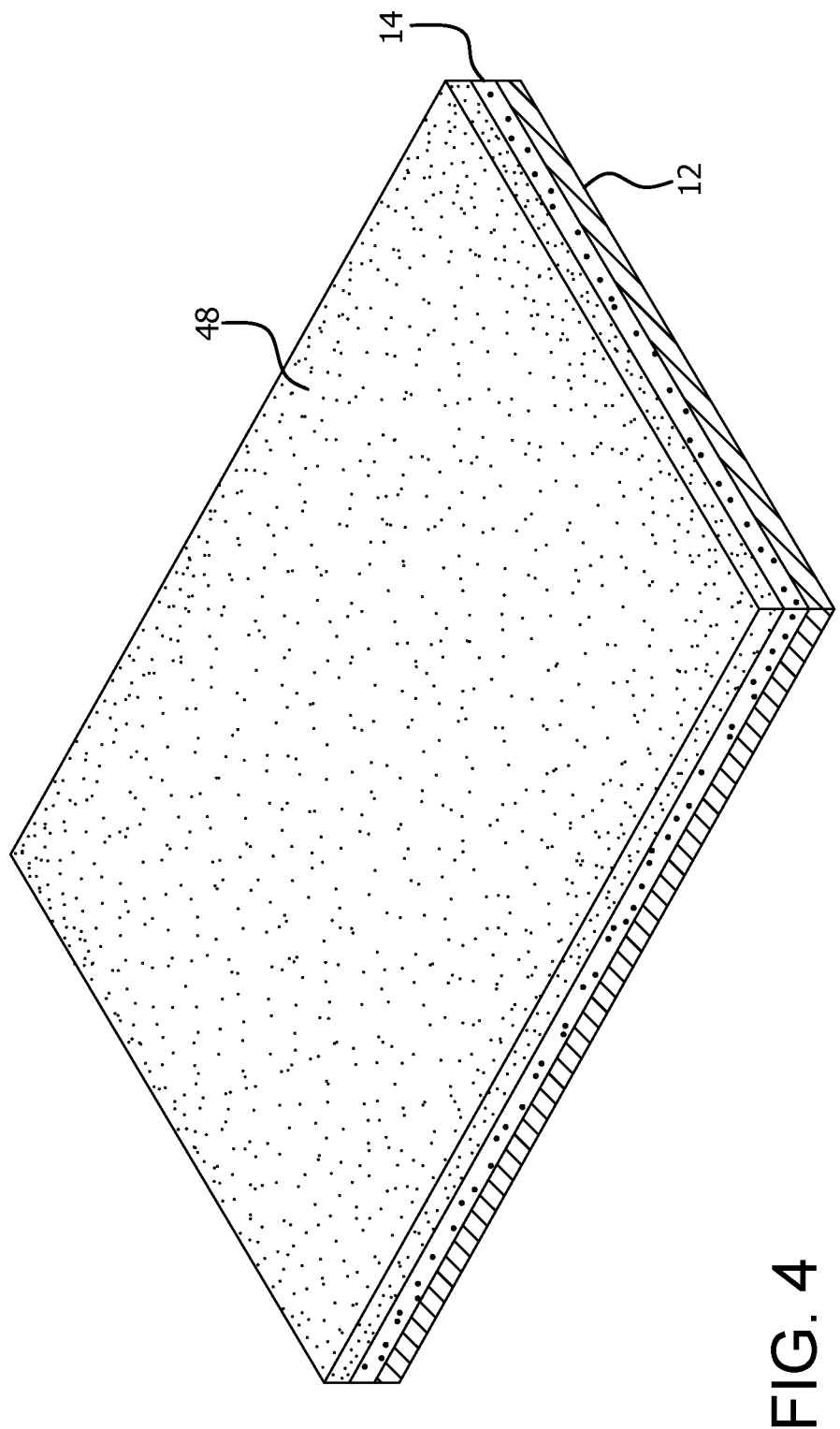
FIG. 4 is a perspective view of a substrate for the printable glitter paper of FIG. 1, after application of a second adhesive layer above the first adhesive layer and the glitter.

Referring to FIGS. 4 and 7-8, a second adhesive layer 48 is applied over the first adhesive layer 14 and glitter 26. The illustrated example of the second adhesive layer is a water-based glue, which in the illustrated example is a mixture of water, styrene, acrylic acid, and butyl acrylate. The second adhesive layer 48 in the illustrated example is applied to a thickness of about 0.005 mm. In most examples, the second adhesive layer 48 will cover the entire front surface 24 of the substrate 12. In all examples, the second adhesive layer 48 will cover substantially the entire first adhesive layer 14. As used herein, covering substantially all is defined as covering a sufficient portion to retain all glitter that has been retained within the first adhesive layer 14, as well as covering a sufficient portion to provide a smooth printing surface. As shown in FIGS. 7 and 8, the substrate 12 passes around the rollers 50, 52, 54 so that the front 24 of the substrate 12 faces downward as the substrate passes between the rollers 56, 58. The roller 58 is partially submerged within the water-based adhesive within the second adhesive tray 60. As the substrate 12 passes between the rollers 56, 58, glue is picked up by the roller 58, and transferred to the front face 24 of the substrate 12. Since the substrate 12 is in contact with both the rollers 58, 60, excess glue is squeezed off of the substrate 12, and drips back into the tray 60, thus controlling the thickness of the second adhesive layer.

Continuing to refer to FIGS. 7-8, the substrate 12 passes around a roller 62 so that the front 24 of the substrate 12 faces generally upward. The substrate 12 then proceeds into a high temperature drying oven 64. Some examples of the drying oven 64 maintain a temperature of about 130° C. to about 160° C., and other examples maintain a temperature of about 150° C. The time and temperature can be adjusted according to the specific adhesives used, the thickness of the adhesive, external environmental factors, the specific substrate 12 being used, and other factors. The length of the high temperature drying oven 64, as well as the rate at which the substrate 12 proceeds through the drying oven 64, are determined so that the first adhesive layer 14 and second adhesive layer 48 are completely dried and cured by the time the substrate 12 exits the drying oven 64. Upon exiting the oven 64, the substrate 12 passes around cooling rollers 66, 68, 70, and is then wound onto a roll 72. The roll 72 of the substrate 12 may then be moved to a different machine for further processing.

At this stage, the process of preparing the glitter paper 10 may vary, depending on the intended end use of the glitter paper 10. For some applications, such as offset printing, offset UV printing, screen printing, and wide format inkjet printing, the process may proceed directly to application of the anti-curl coating illustrated in FIGS. 6 and 12. If the glitter paper 10 is to be used for a process requiring greater smoothness and glitter adhesion, such as indigo ink printing, then the process continues to the steps illustrated in FIGS. 5 and 10-11.

Figure 10:
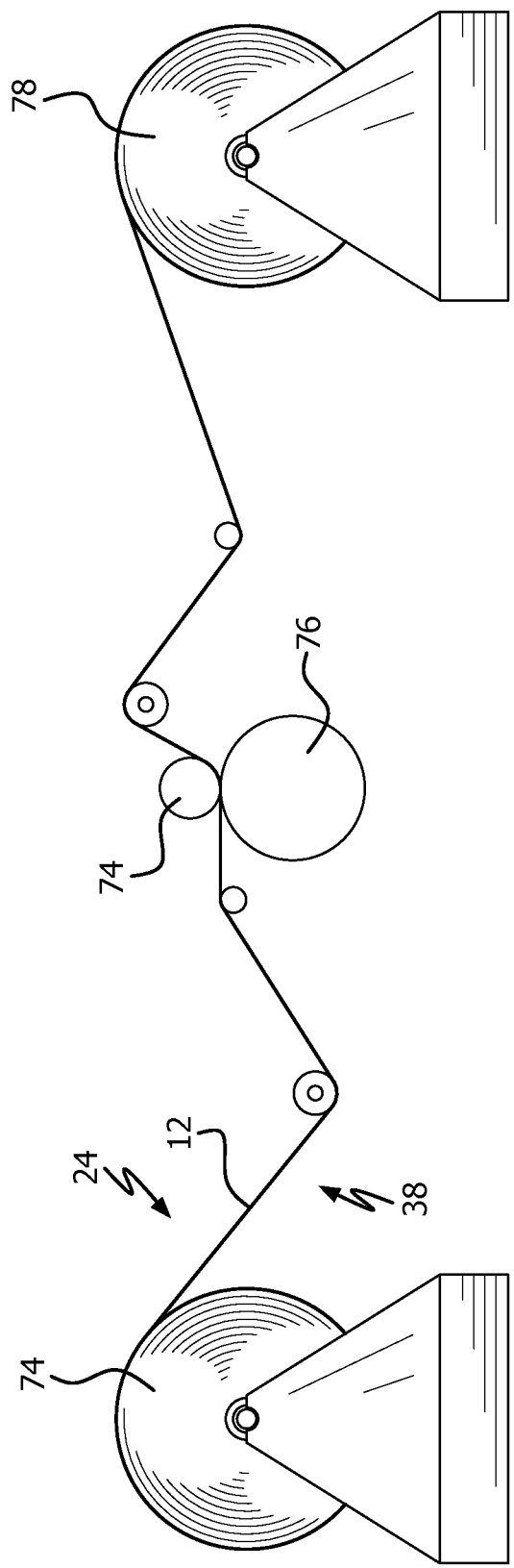
FIG. 10 is a diagrammatic view of high pressure surface smoothing of the first and second adhesive layers.

After the first adhesive layer 14 and second adhesive layer 48 are fully cured, the substrate 12 is subjected to a high-pressure polishing step in order to smooth the top surface of the second adhesive layer 48. Referring to FIG. 10, as the substrate 12 is unwound from the roll 72, it passes between an upper chrome plated iron polishing roller 74 and a lower wool roller 76. The front surface 24 of the substrate 12 faces the polishing roller 74, so that the wool roller 76 protects the back surface 38. The substrate 12, first adhesive layer 14, and second adhesive layer 48 are subjected to a pressure of about 10 MPa to about 11 MPa between the rollers 74, 76 as the front surface 24 is polished by the roller 74. During this step, the glitter 26 is embedded into the substrate 12, which serves to smooth the surface 24 as well as to further trap the glitter 26 after application of the ink receptive top coating described below. After the high-pressure polishing step, the substrate 12 is wound onto the roll 78.

Figure 5:
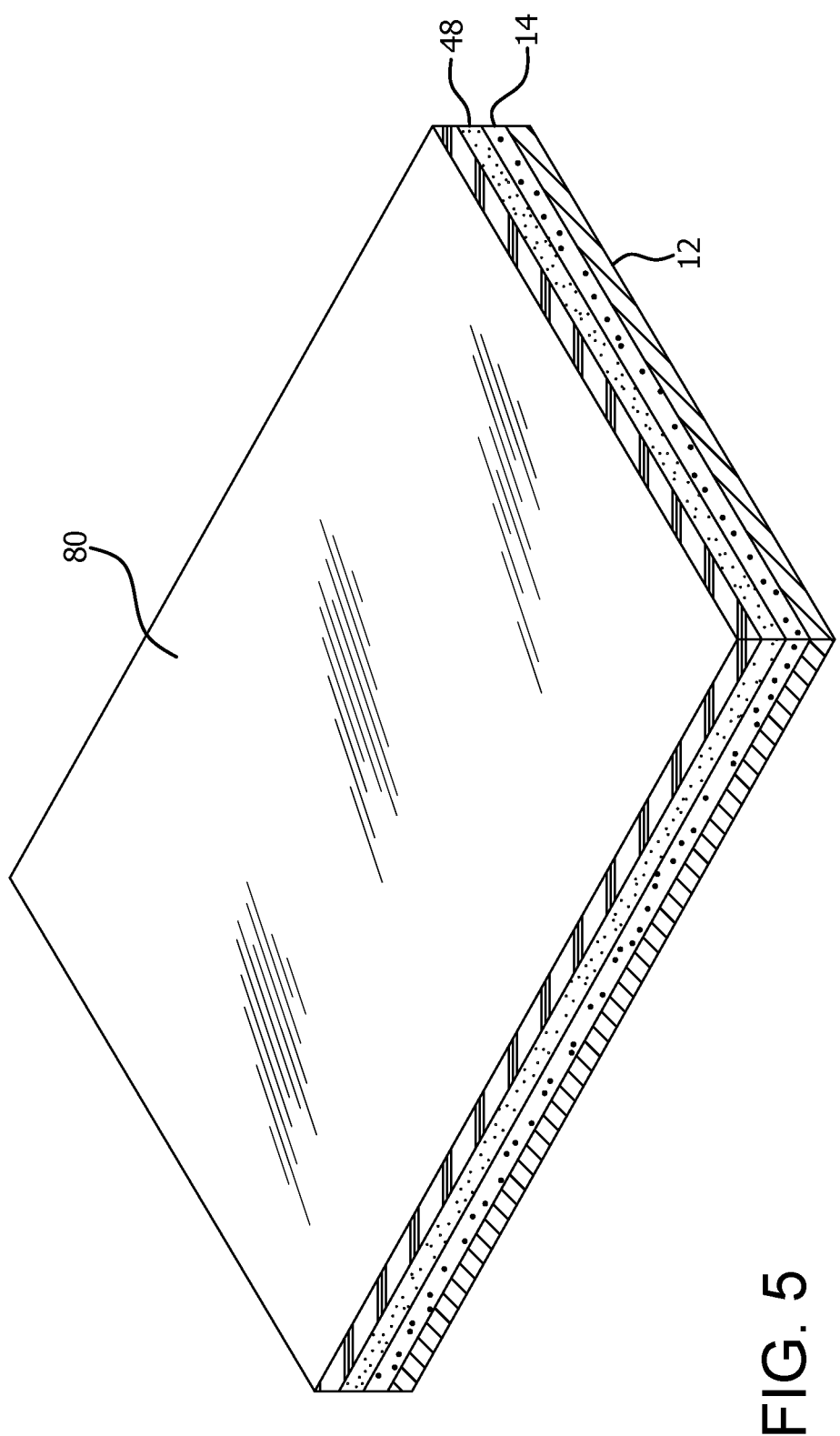
FIG. 5 is a perspective view of a substrate for the printable glitter paper of FIG. 1, after application of an ink-receptive top coating above the second adhesive layer.
Figure 11:
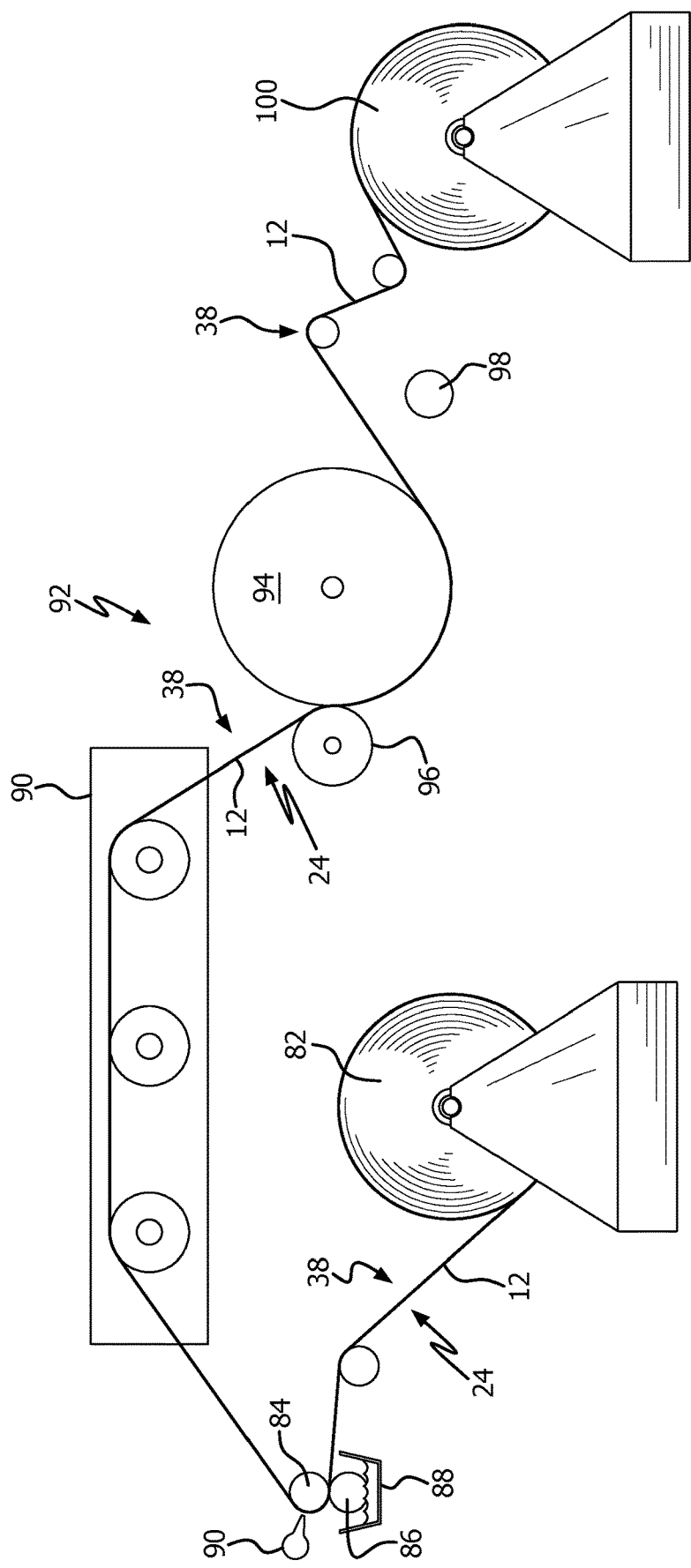
FIG. 11 is a diagrammatic view of the process of applying an ink receptive top coating as well as high temperature drying of the ink receptive top coating.

Referring to FIGS. 5 and 11, a coating 80 is applied over the second adhesive layer 48. The coating 80 forms the outer surface of the front face 24 of the glitter paper 10. The illustrated example of the coating 80 includes about 41.2% water, about 45.47% silica gel, about 0.7% glycerol, about 7.1% polyethylene, about 1.3% drying agent, about 0.9% A20 Aluminum powder, about 2.6% fixative. and about 0.73% thickener. This coating is made by first mixing water (15.8% of the total coating composition) and silica gel at about 5,000 r.p.m. for about 1.5 hours. Glycerol is added, and the resulting mixture is mixed for about 20 minutes at about 5,000 r.p.m. Polyethylene and the drying agent are added, and the mixture is mixed for about 30 minutes at about 5,000 r.p.m. A20 Aluminum powder is added, and the mixture is mixed at about 5,000 r.p.m. for about 30 minutes. The fixative is added next, and the mixture is mixed for about 2 hours at about 5,000 r.p.m. The remaining water is added along with a thickener, and the final mixture is mixed at about 1,500 r.p.m. for about 3.5 hours. The coating is then held in a holding tank for about 6 hours, at which point it is ready for use.

FIG. 11 illustrates the step of applying the coating 80. Prior to this step, the substrate 12 is unwound from the roll 78, and wound onto the roll 82, so that as the substrate 12 is unwound from the roll 80, the front face 24 of the substrate 12 faces downward. The substrate 12 passes between an upper roller 84 and a lower roller 86. The lower roller 86 is partially submerged within the liquid coating mix contained within the coating tray 88. When the substrate 12 passes between the rollers 84, 86, it comes in contact with the roller 86, which applies the coating over the second adhesive layer 48. Because the substrate 12 passes between and is in contact with the rollers 84, 86, excess coating is squeezed off of the second adhesive layer 48, and drips back into the tray 88, so that the thickness of the coating 80 is controlled. Excess coating is further controlled by the air scraper 90. The air scraper 90 includes a bar with a 0.5 mm opening along its length. Pressurized air is forced through this opening, creating a blade of high-pressure air directed towards the coating 80, smoothing the coating 80 as well as pushing the coating 80 into any depressions that may be present below the coating 80. In the illustrated example, this coating is applied to a thickness of about 0.01 mm to about 0.02 mm, which corresponds to about 18 g/m$^2$ of coating.

After the coating 80 is applied, the substrate 12 proceeds into a drying/curing oven 90. Some examples of the oven 90 may be set at a temperature of about 130° C. to about 160° C. Other examples may be set at a temperature of about 150° C. The substrate 12 remains within the oven 94 about one minute, although the temperature and drying time may vary based on environmental conditions and other factors. After the substrate 12 exits the oven, the substrate 12 proceeds through a steam dryer 92. As the substrate 12 enters the steam dryer 92, it passes between a steam dryer roller 94, which is heated with steam, and a pressure applying roller 96. The pressure applied at this stage is about 1 MPa. The combination of heat and pressure smooths and flattens the front surface 24. After exiting the steam dryer 92, the substrate 12 passes a steam bar/sprayer 98. The steam bar/sprayer 98 has a narrow slit across its length, through which steam is sprayed onto the back 38 of the substrate 12. During the various drying/curing stages, the front side 24 of the substrate 12 is protected by the various adhesives and coatings applied thereto, and thus moisture will be retained within the front side of the substrate 12. The backside 38 is unprotected, and will therefore not retain moisture. The application of steam to the back 38 balances the moisture levels between the front 24 and back 38. The temperature of the steam is greater than about 100° C. At this stage, the substrate 12 is rolled onto a roll 100.

Figure 6:
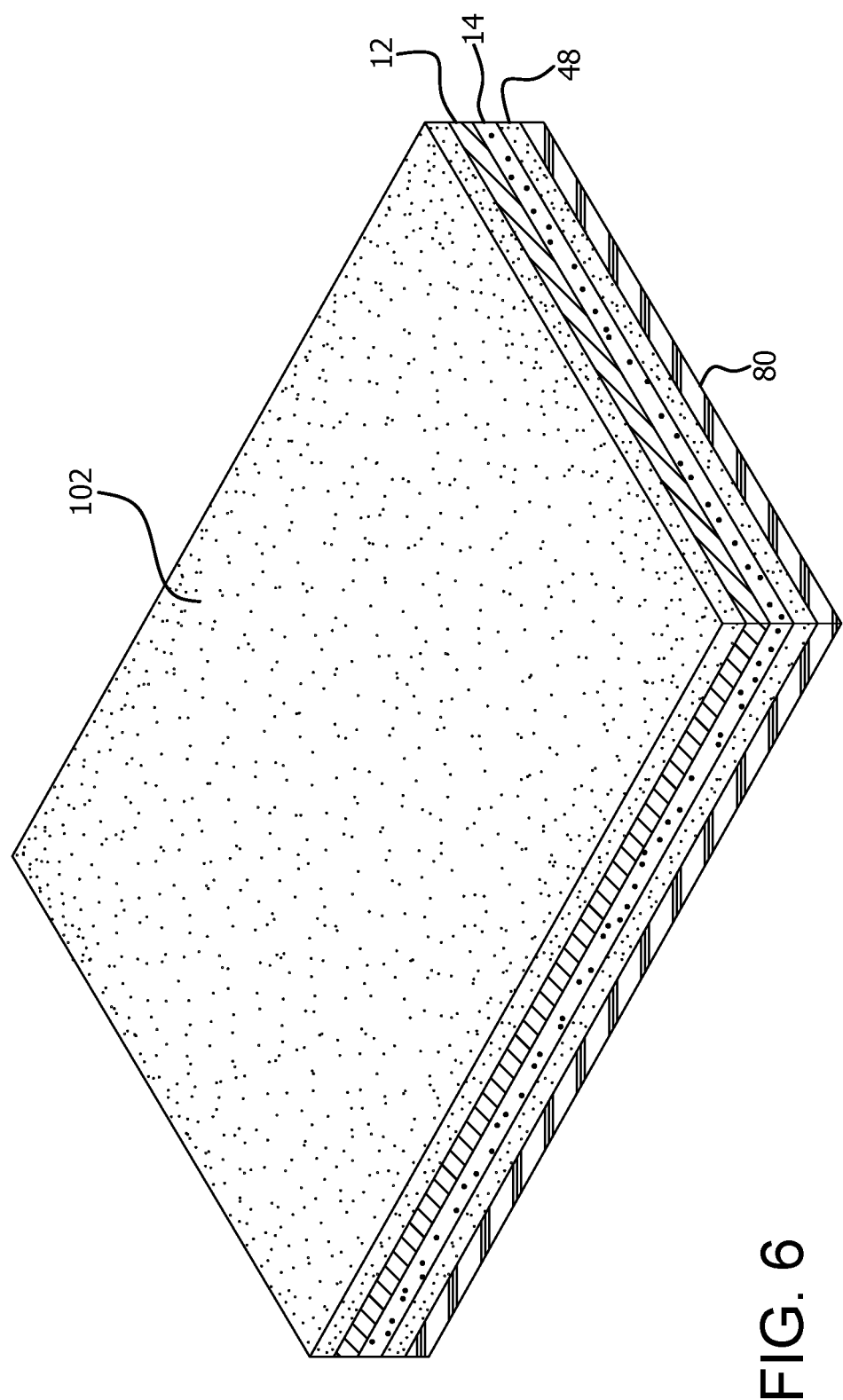
FIG. 6 is another perspective view of the printable glitter paper of FIG. 1, after application of an anti-curl layer to the back surface of the substrate.
Figure 12:
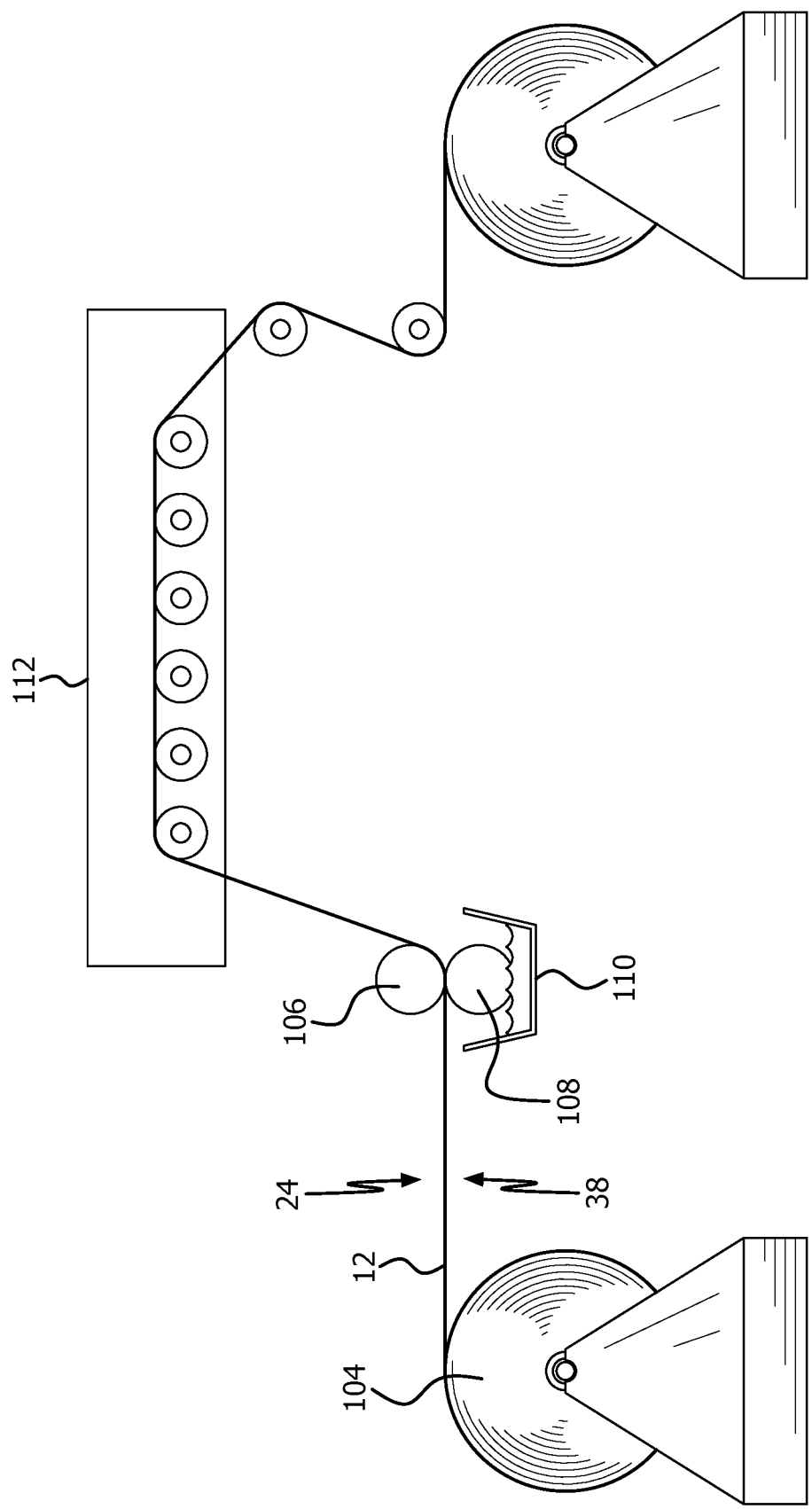
FIG. 12 is a diagrammatic view of the application of an adhesive layer to the back surface of the paper.

If the substrate 12 is made from a paper that does not include a clay, kaolin, or other water resistant coating, then it is desirable to place an ink receptive top, anti-curl coating to the back 38 of the substrate 12. In the illustrated example, this coating is a water-based adhesive 102, which is shown in FIG. 6. The water-based adhesive used for the layer 102 is similar to the water-based adhesive used for the layer 48, but is made from about 90% water, and 10% other ingredients. The application of the water-based adhesive is illustrated in FIG. 12. Prior to this step, the substrate 12 is unwound from the roll 100, and is rewound onto the roll 104, so that the front of the substrate 24 faces upward, and the back surface 38, to which the water-based adhesive will be applied, faces downward. As the substrate 12 is unwound from the roll 102, it passes between an upper roller 106 and a lower roller 108. The lower roller 108 is partially submerged within a water-based adhesive contained within the tray 110. As the substrate 12 passes between the rollers 106, 108, the roller 108 applies the adhesive layer 102 to the back surface 38 of the substrate 12. Because the substrate 12 is in contact with both of the rollers 106, 108, excess adhesive is squeezed off of the back surface 38, and drips back into the tray 110.

Once the layer 102 is applied. The substrate 12 then proceeds into a high temperature drying oven 112. Some examples of the drying oven 112 maintain a temperature of about 130° C. to about 160° C., and other examples maintain a temperature of about 150° C. The time and temperature can be adjusted according to the specific adhesives used, the thickness of the adhesive, external environmental factors, the specific substrate 12 being used, and other factors. The length of the high temperature drying oven 112, as well as the rate at which the substrate 12 proceeds through the drying oven 112, are determined so that the back adhesive layer 102 is completely dried and cured by the time the substrate 12 exits the drying oven 112. Upon exiting the oven 112, the substrate 12 is wound onto a roll 114.

The above example describes the use of a plurality machines to produce the glitter paper 10. The first machine applies the first layer 14, glitter 26, second layer 48, and then heats and cures these layers. The second machine performs the high pressure polishing. A third machine applies the top coating 80, and also performs heating and curing. The adhesive layer 102 may be applied by a second pass of the material through the first machine, routing the material so that unnecessary steps are skipped. Numerous variations in the specific manner in which each machine carries out each step are possible. The use of other machine and process setups are possible, including but not limited to the use of a single automated machine or assembly line to perform all of the above steps, or the use of separate machines to perform each individual step.

The present invention therefore provides a printable glitter paper having a smooth, ink receptive surface, and excellent retention of the glitter, making the printable glitter paper suitable for use in a variety of printing machines. Some examples of the printable glitter paper can be used for photograph-quality printing, and provide the necessary smoothness, ink reception, and ink adhesion for use in indigo ink printers. The printable glitter paper also works extremely well in ink jet printing machines, as well as other printing machines. A process for making the printable glitter paper is also provided. A coating for use as the front printing surface of the printable glitter paper is provided as well.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A printable medium, comprising:
   a flat, flexible substrate having a front surface and a back surface;
   a first adhesive layer covering a portion of the front surface of the substrate;
   a plurality of glitter flakes dispersed across substantially all of the first adhesive layer; and
   a second adhesive layer covering substantially all of the first adhesive layer and glitter flakes, wherein the second adhesive layer is formed from a water based glue consisting of water, styrene, acrylic acid, and butyl acrylate.

2. The printable medium of claim 1, wherein the first adhesive layer is formed from an oil-based glue.

3. The printable medium of claim 2, wherein the oil-based glue includes polyester polyol, isocyanate, and solvents.

4. The printable medium of claim 1, wherein the first adhesive layer covers substantially all of the front surface of the substrate.

5. A printable medium, comprising:
   a flat, flexible substrate having a front surface and a back surface;
   a first adhesive coating covering a portion of the front surface of the substrate;
   a plurality of glitter flakes dispersed across substantially all of the first adhesive coating;
   a second adhesive coating covering substantially all of the first adhesive coating and glitter flakes; and
   a top coating covering substantially all the second adhesive coating, the top coating comprising silica gel, glycerol, polyethylene, a drying agent, A20 Aluminum powder, a fixative, and a thickener.

6. A printable medium, comprising:
   a flat, flexible substrate having a front surface and a back surface;
   a first adhesive coating covering a portion of the front surface of the substrate;
   a plurality of glitter flakes dispersed across substantially all of the first adhesive coating;
   a second adhesive coating covering substantially all of the first adhesive coating and glitter flakes; and
   a back adhesive layer covering substantially all of the back surface of the substrate.

7. The printable medium of claim 6, wherein the back adhesive layer is formed from a water-based glue.

8. The printable medium of claim 7, wherein the water based glue includes water, styrene, acrylic acid, and butyl acrylate.

9. A method of making a printable medium, comprising:
   providing a flat, flexible substrate having a front surface and a back surface;
   applying a first adhesive layer to a portion of the front surface of the substrate;
   applying a plurality of glitter flakes across substantially all of the first adhesive layer;
   applying a second adhesive layer to substantially all of the first adhesive layer and glitter flakes, wherein the second adhesive layer is formed from a water based glue consisting of water, styrene, acrylic acid, and butyl acrylate; and
   applying heat to the substrate, first adhesive layer, and second adhesive layer.

10. The method of claim 9, wherein the first adhesive layer is funned, from an oil-based glue.

11. The method of claim 10, wherein the oil-based resin includes polyester polyol, isocyanate, and solvents.

12. The method of claim 9, wherein the step of applying heat to the substrate, first adhesive coating, and second adhesive coating is performed at a temperature of about 130° C. to about 160° C.

13. A method of making a printable medium, comprising:
    providing a flat, flexible substrate having a front surface and a back surface;
    applying a first adhesive coating to a portion of the front surface of the substrate;

applying a plurality of glitter flakes across substantially all of the first adhesive coating;

applying a second adhesive coating to substantially all of the first adhesive coating and glitter flakes;

applying heat to the substrate, first adhesive coating, and second adhesive coating;

applying, pressure at a first pressure level to the substrate, first adhesive coating, and second adhesive coating;

applying a top coating covering substantially all of the second adhesive coating, the top coating comprising water, silica gel, glycerol, polyethylene, a drying agent, A20 Aluminum powder, a fixative, and a thickener;

applying heat to the substrate, first adhesive coating, second adhesive coating, and top coating; and applying pressure at a second pressure level to the substrate, first adhesive coating, second adhesive coating, and top coating.

14. The method of claim 13, wherein the first pressure level is higher than the second pressure level.

15. The method of claim 13, wherein the first pressure level is about 10 MPa to about 11 MPa of pressure.

16. The method of claim 13, wherein the second pressure level is about 1 MPa.

17. The method of claim 13, wherein the step of applying heat to the substrate, first adhesive coating, second adhesive coating, and top coating is performed at a temperature of about 130° C. to about 160° C.

18. The method of claim 13, further comprising applying steam to the back surface of the substrate.

19. A method of making a printable medium, comprising:
providing a flat, flexible substrate having a front surface and a back surface;

applying a first adhesive layer to a portion of the front surface of the substrate;

applying a plurality of glitter flakes across substantially all of the first adhesive layer;

applying a second adhesive layer to substantially all of the first adhesive layer and glitter flakes;

applying heat to the substrate, first adhesive layer, and second adhesive layer; and providing a back adhesive layer covering substantially all of the back surface of the substrate.

20. The method of claim 19, wherein the back adhesive layer is formed from a water-based glue.

21. The method of claim 20, wherein the water based glue includes water, styrene, acrylic acid, and butyl acrylate.

22. A top coating composition for a printable medium, the top coating comprising water, silica gel, glycerol, polyethylene, a drying agent, A20 Aluminum powder, a fixative, and a thickener.

23. The top coating composition according to claim 22, wherein the top coating comprises about 41.2% water, about 45.47% silica gel, about 0.7% glycerol, about 7.1% polyethylene, about 1.3% drying agent, about 0.9% A20 Aluminum powder, about 2.6% fixative, and about 0.73% thickener.

24. A method of making a top coating composition for a printable medium, the method comprising:
mixing water and silica gel at about 5,000 r.p.m. for about 1.5 hours;

adding glycerol, and mixing the resulting combination for about 20 minutes at about 5,000 r.p.m;

adding polyethylene and a drying agent; and mixing the resulting combination for about 30 minutes at about 5,000 r.p.m;

adding A20 Aluminum powder, and mixing the resulting combination at about 5,000 r.p.m. for about 30 minutes;

adding a fixative, and mixing the resulting combination for about 2 hours at about 5,000 r.p.m; and adding additional water along with a thickener, and mixing the resulting combination at about 1,500 r.p.m. for about 3.5 hours.

* * * * *